(12) United States Patent
Krasadakis

(10) Patent No.: US 10,409,903 B2
(45) Date of Patent: Sep. 10, 2019

(54) UNKNOWN WORD PREDICTOR AND CONTENT-INTEGRATED TRANSLATOR

(71) Applicant: MICROSOFT TECHNOLOGY LICENSING, LLC, Redmond, WA (US)

(72) Inventor: Georgios Krasadakis, Dublin (IE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 19 days.

(21) Appl. No.: 15/168,403

(22) Filed: May 31, 2016

(65) Prior Publication Data
US 2017/0344530 A1 Nov. 30, 2017

(51) Int. Cl.
| | | |
|---|---|---|
| G06F 3/00 | (2006.01) | |
| G06F 17/24 | (2006.01) | |
| G06F 3/0483 | (2013.01) | |
| G06F 3/0484 | (2013.01) | |
| G06F 17/27 | (2006.01) | |

(Continued)

(52) U.S. Cl.
CPC .......... *G06F 17/241* (2013.01); *G06F 3/0483* (2013.01); *G06F 3/04842* (2013.01); *G06F 17/2735* (2013.01); *G06F 17/2795* (2013.01); *G06F 17/2836* (2013.01); *G09B 19/00* (2013.01)

(58) Field of Classification Search
CPC .. G06F 17/241; G06F 3/0483; G06F 3/04842; G06F 17/2795; G06F 17/2836; G09B 19/00
See application file for complete search history.

(56) References Cited

U.S. PATENT DOCUMENTS

| 5,359,514 A | 10/1994 | Manthuruthil et al. |
| 7,228,268 B2 | 6/2007 | Xun |

(Continued)

FOREIGN PATENT DOCUMENTS

| CN | 100469109 C | 3/2009 |
| WO | 2007141020 A1 | 12/2007 |

OTHER PUBLICATIONS

Kirst, et al., "Location-Based Auto-Suggested Vocabulary Lists: A Design Exploration", Retrieved on: Feb. 25, 2016, Available at: https://voxy.com/blog/wp-content/uploads/2011/03/location-based-vocab.pdf.

(Continued)

*Primary Examiner* — Kyle R Stork
(74) *Attorney, Agent, or Firm* — Shook, Hardy & Bacon LLP

(57) ABSTRACT

The technology described herein enables users to enrich their vocabulary by annotating and/or automatically translating specific words, which are predicted to be unknown to the specific user. The user experiences the original content enriched with adaptive, smart in-line annotations of unknown words. The technology is tailored to individual users by understanding an individual user's vocabulary in a particular language. As a user consumes content or performs document authoring/editing activities, the system captures language usage patterns, maintained in a private Vocabulary Analytics Store (VAS) for the particular user. Information in the VAS is used as input to a machine classifier that determines whether a word is likely to be known or unknown to a user.

20 Claims, 10 Drawing Sheets

(51) Int. Cl.
*G06F 17/28* (2006.01)
*G09B 19/00* (2006.01)

(56) References Cited

U.S. PATENT DOCUMENTS

| | | |
|---|---|---|
| 7,478,033 B2 | 1/2009 | Wu et al. |
| 8,935,150 B2 | 1/2015 | Christ |
| 9,037,450 B2 | 5/2015 | Vukosavljevic et al. |
| 9,183,197 B2 | 11/2015 | Eden et al. |
| 2003/0160830 A1 | 8/2003 | DeGross |
| 2006/0099562 A1 | 5/2006 | Carlsson |
| 2006/0100849 A1* | 5/2006 | Chan .................. G06F 17/241 704/8 |
| 2007/0189724 A1 | 8/2007 | Wan et al. |
| 2007/0276814 A1 | 11/2007 | Williams |
| 2008/0301096 A1 | 12/2008 | Kogan et al. |
| 2009/0306959 A1 | 12/2009 | Rappoport et al. |
| 2009/0306969 A1* | 12/2009 | Goud .................. G06F 17/2735 704/10 |
| 2010/0003659 A1 | 1/2010 | Edmonds |
| 2010/0042399 A1 | 2/2010 | Park |
| 2014/0006006 A1 | 1/2014 | Christ |
| 2014/0163980 A1 | 6/2014 | Tesch et al. |
| 2015/0046496 A1 | 2/2015 | Karmarkar et al. |
| 2015/0052098 A1 | 2/2015 | Kveton et al. |
| 2015/0161984 A1 | 6/2015 | VanBlon et al. |
| 2015/0310002 A1 | 10/2015 | Yu et al. |
| 2017/0186338 A1* | 6/2017 | Treves .................. G09B 5/06 |

OTHER PUBLICATIONS

"Google Translate", Published on: Dec. 9, 2015 Available at: http://appshopper.com/reference/google-translate.

"International Search Report and Written Opinion Issued in PCT Application No. PCT/US2017/032780", dated Aug. 31, 2017, 14 Pages.

* cited by examiner

300 — Call me Ishmael. Some years ago- never mind how long precisely- having little or no money in my purse, and nothing particular to interest me on shore, I thought I would sail about a little and see the watery part of the world. It is a way I have of driving off the spleen and regulating the circulation. Whenever I find myself growing ӻ 310 ıbout the mouth; whenever it is a damp, drizzly November in my soul; whenever I find myself involuntarily pausing before coffin warehouses, and bringing up the rear of every funeral I meet; and especially whenever my hypos get such an upper hand of me, that it requires a strong moral principle to prevent me from deliberately stepping into the street, and methodically knocking people's hats off- then, I account it high time to get to sea as soon as I can. This is my substitute for pistol and ball. With a philosophical flourish Cato throws himself upon his sword; I quietly take to the ship. T 312 ıs n 314 g surprising in this. If they but knew it, almost all men in their degree, some time or other, cherish very nearly the same feelings towards the ocean with me.

There now is your in316sular city of the Manh318attoes, belted round by wharves as Indian isles by coral reefs- commerce surrounds it with her surf. Right and left, the streets take you waterward. Its extreme downtown is the battery, where that noble mole is washed by waves, and cooled by breezes, which a few hours previous were out of sight of land. Look at the crowds of water-gazers there.

Circum320ámbulate the city of a dreamy Sabbath afternoon. Go from Corlears Hook to Coenties Slip, and from thence, b 322 itehall, northward. What do you see?- Posted like silent sentinels all around the town, stand thousands upon thousands of mortal men fixed in ocean reveries. Some leaning against the spiles; some seated upon the pier-heads; some looking over the bulwarks of ships from China; some high aloft in the rigging, as if striving to get a still better seaward peep. But these are all landsmen; of week days pent up in lath and plaster- tied to counters, nailed to benches, clinched to desks. How then is this? Are the green fields gone? What do they here?

*FIG. 3.*

Call me Ishmael. Some years ago- never mind how long precisely- having little or no money in my purse, and nothing particular to interest me on shore, I thought I would sail about a little and see the watery part of the world. It is a way I have of driving off the spleen and regulating the circulation. Whenever I find myself growing grim about the mouth; whenever it is a damp, drizzly November in my soul; whenever I find myself involuntarily pausing before coffin warehouses, and bringing up the rear of every funeral I meet; and especially whenever my hypos get such an upper hand of me, that it requires a strong moral principle to prevent me from deliberately stepping into the street, and methodically knocking people's hats off- then, I account it high time to get to sea as soon as I can. This is my substitute for pistol and ball. With a philosophical flourish Cato throws himself upon his sword; I quietly take to the ship. There is nothing surprising in this. If they but knew it, almost all men in their degree, some time or other, cherish very nearly the same feelings towards the ocean with me. 334 — Manhattan, a borough of New York City — 332 / 330
318 —
There now is your insular city of the Manhattoes, belted round by wharves as Indian isles by coral reefs- commerce surrounds it with her surf. Right and left, the streets take you waterward. Its extreme downtown is the battery, where that noble mole is washed by waves, and cooled by breezes, which a few hours previous were out of sight of land. Look at the crowds of water-gazers there.

Circumambulate the city of a dreamy Sabbath afternoon. Go from Corlears Hook to Coenties Slip, and from thence, by Whitehall, northward. What do you see?- Posted like silent sentinels all around the town, stand thousands upon thousands of mortal men fixed in ocean reveries. Some leaning against the spiles; some seated upon the pier-heads; some looking over the bulwarks of ships from China; some high aloft in the rigging, as if striving to get a still better seaward peep. But these are all landsmen; of week days pent up in lath and plaster- tied to counters, nailed to benches, clinched to desks. How then is this? Are the green fields gone? What do they here?

*FIG. 4.*

Call me Ishmael. Some years ago- never mind how long precisely- having little or no money in my purse, and nothing particular to interest me on shore, I thought I would sail about a little and see the watery part of the world. It is a way I have of driving off the spleen and regulating the circulation. Whenever I find myself growing grim about the mouth; whenever it is a damp, drizzly November in my soul; whenever I find myself involuntarily pausing before coffin warehouses, and bringing up the rear of every funeral I meet; and especially whenever my hypos get such an upper hand of me, that it requires a strong moral principle to prevent me from deliberately stepping into the street, and methodically knocking people's hats off- then, I account it high time to get to sea as soon as I can. This is my substitute for pistol and ball. With a philosophical flourish Cato throws himself upon his sword; I quietly take to the ship. There is nothing surprising in this. If they but knew it, almost all men in their degree, some time or other, cherish very nearly the same feelings towards the ocean with me.

There now is your insular city of the Manhattoes, belted round by wharves as Indian isles by coral reefs- commerce surrounds it with her surf. Right and left, the streets take you waterward. Its extreme downtown is the battery, where that noble mole is washed by waves, and cooled by breezes, which a few hours previous were out of sight of land. Look at the crowds of water-gazers there.

320 — 342 —[ To walk all the way around something ] —340

Circumambulate the city of a dreamy Sabbath afternoon. Go from Corlears Hook to Coenties Slip, and from thence, by Whitehall, northward. What do you see?- Posted like silent sentinels all around the town, stand thousands upon thousands of mortal men fixed in ocean reveries. Some leaning against the spiles; some seated upon the pier-heads; some looking over the bulwarks of ships from China; some high aloft in the rigging, as if striving to get a still better seaward peep. But these are all landsmen; of week days pent up in lath and plaster- tied to counters, nailed to benches, clinched to desks. How then is this? Are the green fields gone? What do they here?

*FIG. 5.*

Call me Ishmael. Some years ago- never mind how long precisely- having little or no money in my purse, and nothing particular to interest me on shore, I thought I would sail about a little and see the watery part of the world. It is a way I have of driving off the spleen and regulating the circulation. Whenever I find myself growing grim about the mouth; whenever it is a damp, drizzly November in my soul; whenever I find myself involuntarily pausing before coffin warehouses, and bringing up the rear of every funeral I meet; and especially whenever my hypos get such an upper hand of me, that it requires a strong moral principle to prevent me from deliberately stepping into the street, and methodically knocking people's hats off- then, I account it high time to get to sea as soon as I can. This is my substitute for pistol and ball. With a philosophical flourish Cato throws himself upon his sword; I quietly take to the ship. There is nothing surprising in this. If they but knew it, almost all men in their degree, some time or other, cherish very nearly the same feelings towards the ocean with me.

There now is your insular city of the Manhattoes, belted round by wharves as Indian isles by coral reefs- commerce surrounds it with her surf. Right and left, the streets take you waterward. Its extreme downtown is the battery, where that noble mole is washed by waves, and cooled by breezes, which a few hours previous were out of sight of land. Look at the crowds of water-gazers there.

Circumambulate the city of a dreamy Sabbath afternoon. Go from Corlears Hook to Coenties Slip, and from thence, by Whitehall, northward. What do you see?- Posted like silent sentinels all around the town, stand thousands upon thousands of mortal men fixed in ocean reveries. Some leaning against the spiles; some seated upon the pier-heads; some looking over the bulwarks of ships from China; some high aloft in the rigging, as if striving to get a still better seaward peep. But these are all landsmen; of week days pent up in lath and plaster- tied to counters, nailed to benches, clinched to desks. How then is this? Are the green fields gone? What do they here?

352: φρουρός lookout, sentry, scout 350, 354, 322

*FIG. 6.*

UNKNOWN WORD PREDICTOR AND CONTENT-INTEGRATED TRANSLATOR

BACKGROUND

A user wanting to know the definition of an unknown word can look it up in a hard copy or online dictionary. Search engines or personal assistant applications can also provide the definition of the word as a direct search result. In addition, automated computer translation of a text from one language to another language makes more content available to more people.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein enables users to enrich their vocabulary by annotating and/or automatically translating specific words, which are predicted to be unknown to the specific user. The translation and/or annotation can occur contextually within a document the user reading. For example, an unknown word could be replaced with a known synonym or linked to a definition. The user experiences the original content enriched with adaptive, smart in-line annotations explaining the meaning of the predicted unknown words. The original content can be a web page, book, paper, email, social post, blog entry, or any other form of communication that includes language content. The annotation can take the form of an explanation of a person, place, or thing; a definition; a translation; a synonym; one or more usage examples; one more pieces of real content using the same word; or some other form of comprehension assistance. In one aspect, unknown words are replaced in the text with known synonyms. Use of the technology can allow a user to understand content that would not otherwise be meaningful due to a limited vocabulary.

The technology is tailored to individual users by understanding an individual user's vocabulary in a particular language. As a user consumes content (news, entertainment, social posts) or performs document reading/authoring/editing activities or communicates through typical online channels, such as chat applications, email applications, voice/video conference systems, the system captures language usage patterns. The patterns can be appended and maintained in a rich, private Vocabulary Analytics Store (VAS) for the particular user. The VAS is a knowledge base comprising one or more databases or data stores and analytical components, describing—in terms of patterns, stats, specific word listing, frequencies and contextual data—how the user is using one or more languages (and the progress/change of this usage over time).

BRIEF DESCRIPTION OF THE DRAWINGS

Aspects of the technology described in the present application are described in detail below with reference to the attached drawing figures, wherein:

FIG. 3 is a diagram depicting an interface with unknown words visibly emphasized, in accordance with an aspect of the technology described herein;

FIG. 4 is a diagram depicting an interface with an explanatory annotation for an unknown word, in accordance with an aspect of the technology described herein;

FIG. 5 is a diagram depicting an interface with a definitional annotation for an unknown word, in accordance with an aspect of the technology described herein;

FIG. 6 is a diagram depicting an interface with a translation and synonym annotation for an unknown word, in accordance with an aspect of the technology described herein;

DETAILED DESCRIPTION

Figure 1:
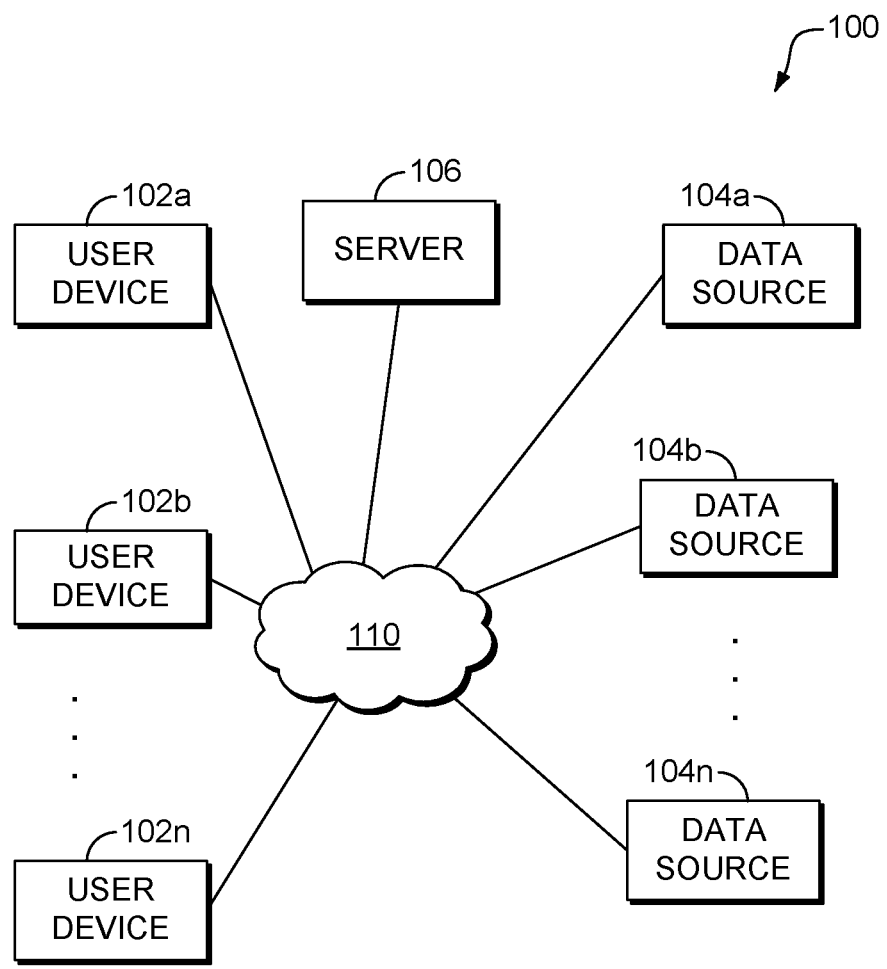
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein enables users to enrich their vocabulary by annotating and/or automatically translating specific words, which are predicted to be unknown to the specific user. The translation and/or annotation can occur contextually within a document the user reading. For example, an unknown word could be replaced with a known synonym or linked to a definition. The user experiences the original content enriched with adaptive, smart in-line annotations explaining the meaning of the predicted of unknown words. The original content can be a web page, book, a document, scanned paper, email, social post, blog entry, image including text, or any other form of communication that includes language content. The annotation can take the form of an explanation of a person, place, or thing; a definition; a translation; a synonym; one or more usage examples; one more pieces of real content using the same word; or some other form of comprehension assistance. Use of the technology can allow a user to understand content that would not otherwise be meaningful due to a limited vocabulary.

The technology is tailored to individual users by understanding an individual user's vocabulary in a particular language. As a user consumes content (news, entertainment, social posts) or performs document reading/authoring/editing activities or communicates through typical online channels, the system captures language usage patterns, maintained in a rich, private Vocabulary Analytics Store (VAS) for the particular user. The VAS is a knowledge base describing—in terms of patterns, stats, specific word listing, frequencies and contextual data—how the user is using one or more languages (and the progress/change of this usage over time). The VAS can also host records of translation requests the user is making to one or more connected dictionary/translation services. The requested words can be entered in a phrasebook that can be part of or separate from the VAS. The phrasebook can also be populated with words determined to be unknown to the user by a machine classifier. As used herein, the phrase machine classifier can include any statistical modeling techniques suitable for the purpose of determining whether words are known or unknown to a person. The VAS may also host or connect to publicly available stats and metadata on certain words and the usage rates of words by specific audiences. Audience can be defined by various demographic characteristics such as geographic location. For example, the usage rate of certain words in the English language can differ significantly between people located in Australia and people located in the United States. Significant differences can exist between regions within a country. Audiences can be defined based on age as generational differences can exist for word usage. Audiences can also be defined by profession. For example, doctors, lawyers, computer programmers, and psychologists may have familiarity with individual words common to the profession.

Audiences can also be defined by interests. For example, sports lovers may have a deep understanding of words used in the sport context, whereas political junkies may have a deep understanding of words used in the political context but have a rather shallow understanding of words used in the sports context. User data, including reading logs, can be used to determine user interests. Words can similarly be associated with a context. Even though a sports fanatic may not have been exposed to or used a specific word, such as southpaw, the sports fanatic is more likely to know the meaning of southpaw (e.g., left-handed pitcher) than a person that is not a sports fanatic. Accordingly, a statistical classifier using context as input could assign a lower confidence that the word "southpaw" is unknown to a sports fanatic than a non-sports fanatic even given the same level of exposure and use by the two people.

The user's VAS can be maintained and kept in the background, as the source of data and signals enabling unknown word prediction for the user: the wealth of information provided in the VAS can be used to predict—with a known level of confidence—if any given word is expected to be known to the user or not. In other words, the VAS's content can be used as input to the classifier to calculate at a confidence level that a given word is known or unknown. If a word is classified as unknown and the user is opening content (for instance, an article) containing this word, then the system enriches the original content with an annotation served in-line, on the unknown word, within the article. This happens smoothly with no request or action from the user. Aspects of the technology are not limited to use with a binary classifier. For example, a multi-class classifier could be used to classify a word into one of several different classes such as known, familiar, and un-known. In other cases, a classifier could assign a numeric value between 0 and 1 (for example) indicating the level of user familiarity with the particular word at a particular point in time.

In one aspect, a binary classification machine is used to classify words as either known or unknown. As a preliminary step, words having above a threshold commonality or usage frequency within a language can be excluded from the analysis and designated as known. For example, words like "the," "you," "him," and "her" are widely used and known in the English language. The binary classification machine can be trained to analyze user data in the VAS related to vocabulary knowledge, such as the texts of content read or written, dwell time on pages of text, and reading analytics derived from technology, such as gaze detection where the time spent on individual words can be measured. Gaze detection tracks eye movement on a page or screen using a camera(s). Coming back to a particular word or appearing to stumble over a word can indicate that a word is unknown to the user. The classification machine can also utilize audience data, as described previously. The user can be associated with or assigned to one or more audience profiles or specific demographic segments. These profiles or segments can provide additional input to the classifier and be used to determine whether a word is likely known or unknown.

The user segments or profiles can be used to set up an initial language profile for a user that can be modified as additional activity is received. Having no or limited content consumption data for a particular user, but knowing the geographic location, profession, age group, gender, social preferences and activity (for instance sports page likes, tweets etc.) can associate the user with a particular demographics segment, which is then used to initially set the expected known words for the user. The segment and profile data can be combined with actual content consumption data for the user, authoring activity, communication history data etc., to update the person's expected vocabulary.

Looking a word up in a dictionary, through a translation service, through a personal assistant application, search page, or other technology can also strongly indicate that a word is unknown, at first. In other words, the technology may assume that a recently looked up word is unknown and provide an annotation when the word occurs in future text. As the word is used by the user or the user is exposed to it multiple times, the classification may change to known. In one aspect, recently looked up words by the user are automatically added to the phrasebook. As another scenario, the system may use the recently looked-up word as an annotation to a synonym of the unknown word. This scenario helps the user learn the recently looked-up word by associating it to synonyms known to the user.

Other sources of information about a user's knowledge of a language can include spelling and grammar errors made while composing a document, email, and such. In one aspect, the technology collects instances where spelling or grammar errors were auto-corrected or manually corrected by a user.

In one aspect, the system scans the content being served to the user (for example via a browser, an application, an OS extension, or pre-installed component presenting online content, such as a website or a social media post) against language stats and metadata captured and maintained into a user's VAS including the user's phrasebook (which can include a list of known and unknown words with scores and metadata). The system checks if any of the words in the content are listed as unknown in the phrasebook, and if so, generates annotations (for instance injects additional HTML elements visualizing synonyms or examples). The annotations enrich the content, thus helping the user get the meaning of the unknown word in-context, better understand the content, and start using the word as part of his vocabulary.

In one aspect, that annotation comprises replacing unknown words in the text with known synonyms. A given word can have many synonyms. A contextual synonym shares a context with the unknown word. For example, sports can be the context of a baseball website and politics could be the context of a political website or social post related to politics. The subject matter affinity of the various synonyms can be derived from a definition of the word or usage examples provided in a knowledge base. The subject matter can also be determined by analyzing the frequency of occurrence in content having the same context. For example, a synonym for an unknown word occurring in a sports article could be selected from among many available synonyms based on a frequency of occurrence within a corpus of sports articles compared to the frequency other synonyms are used in the sports context.

The frequency of overall usage could also be considered when selecting a contextual synonym. So a synonym that does not occur frequently in general, but is used at a much higher rate in sports articles could be selected in the sports context, especially if the viewer shows familiarity with sports articles. In one aspect, only synonyms that are likely to be known to a user are evaluated for affinity with a particular context.

The annotations can be provided in the same language as the content or in a different language. For example, the content could be in Spanish and the annotations presented in English. The language of the annotations can be selected by the user through a preferences interface. Alternatively, the system can learn the languages understood by an individual user, derive preferences from observing user events, and select the language of the annotation accordingly. For example, a user that typically looks English words up in an English language dictionary may receive English language annotations when reading English language content. In contrast, a user that typically seeks translations of English words into Spanish may receive Spanish language annotations when reading English content. In one aspect, a translation of an unknown word from a first language into a user's native language (or any language with which the user has a higher fluency level than the content language) is provided when all available synonyms in the first language are also likely unknown to the user. The user's known languages can be explicitly provided by the user or learned by observing the language of content the user consumes or composes.

Alternatively, the annotations can provide content in multiple languages. For example, the annotation could provide a contextual synonym of an unknown English word in English and a French translation of the unknown English word. The annotation can provide content in a language the reader understands well and a second language in which the reader is less fluent.

The system can track user reactions or accept feedback on predictions, to be automatically used for self-improving and optimizing the unknown word prediction system. The system maintains this knowledge of the active vocabulary of the user and its extension with new additions. As soon as the user naturally consumes content (from virtually any site serving content in the form of articles, videos, or audio), the system can identify those unknown or rarely used, recently looked up words and present their best translation in-line or an annotation that helps the user to better understand and start using them.

Having briefly described an overview of aspects of the technology described herein, an exemplary operating environment suitable for use in implementing the technology is described below.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 1000 described in connection to FIG. 10, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. In one aspect textual content can be accessed through the user devices. Aspects of the technology can modify the textual content to provide annotations that help the user understand the predicted unknown words. User's actions, including text composition, through the user devices can be monitored to build and continuously enrich a user-specific VAS. The user's actions across multiple devices can be compiled into sessions consisting of multiple events and entries, including detailed word usage with frequencies, context, phrases and content/document properties. For example, the user can read a digital book or a webpage through an application on the user device. This reading activity can be a session or part of a session, modeled as multiple records/entries/documents depending on the storage model. This session organizes all the words consumed by the user along with frequencies, statistics, metadata, context, and timestamps and is a key input for VAS post processing and enrichment. Similarly, the user could draft emails or other documents which can be used to determine the user's vocabulary and ultimately determine whether other words are known or unknown.

Server 106 can comprise server-side software designed to work in conjunction with client-side software on user devices 102a and 102b through 102n so as to implement any combination of the features and functionalities discussed in the present disclosure. For example, the server 106 can collect information from individuals or a group of individuals that can be used to make decisions about whether a word is known or unknown to a user. In addition, determinations about whether a word is known or unknown can be made on the server 106 or on user devices. In one aspect, a browser plug-in or some other application feature can collect user data, communicate content to an unknown word predictor, and receive a list of words in the content that are likely unknown along with probability and/or confidence level and/or additional metadata. URLs and/or URIs that could be used by the client and/or exposed to the user for additional information, synonyms, or examples could also be provided. For instance the server 106 could know the online dictionaries associated with specific languages, their APIs, and such. Actual links could be included or metadata about which online services to query and get back synonyms, translations, or examples. Querying internal resources or publicly available online resources for synonyms, examples etc. could be the responsibility of the annotation engine 224 or a separate component called by it. The client-side application can then modify the content, for example by updating the document object model of the webpage, and output/inject enriched content with hints, translation, contextual synonyms, examples, links. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one aspect, user devices 102*a* through 102*n* may be the type of computing device described in relation to FIG. 10 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a holographic system, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104*a* and 104*b* through 104*n* may comprise data sources and/or data systems, which provide content to constituents of operating environment 100, or system 200 described in connection to FIG. 2. (For example, in one aspect, one or more data sources 104*a* through 104*n* provide (or make available for accessing) content 210.) Data sources 104*a* and 104*b* through 104*n* may be discrete from user devices 102*a* and 102*b* through 102*n* and server 106 or may be incorporated and/or integrated into at least one of those components. The data sources can comprise a knowledge base that stores information, statistics, and metadata about words and language. For example, the data sources 104*a* through 104*n* can include an online dictionary, knowledge base, translation service, contextual dictionary, spellcheck engine, search engine, or other service that can be used to generate an annotation. In addition, the user's interaction with services provided by data sources 104*a* through 104*n* can be collected in a VAS and used to determine whether a word is unknown to a user. For example, words looked up in a dictionary can be added to a phrasebook as part of the VAS.

Figure 2:
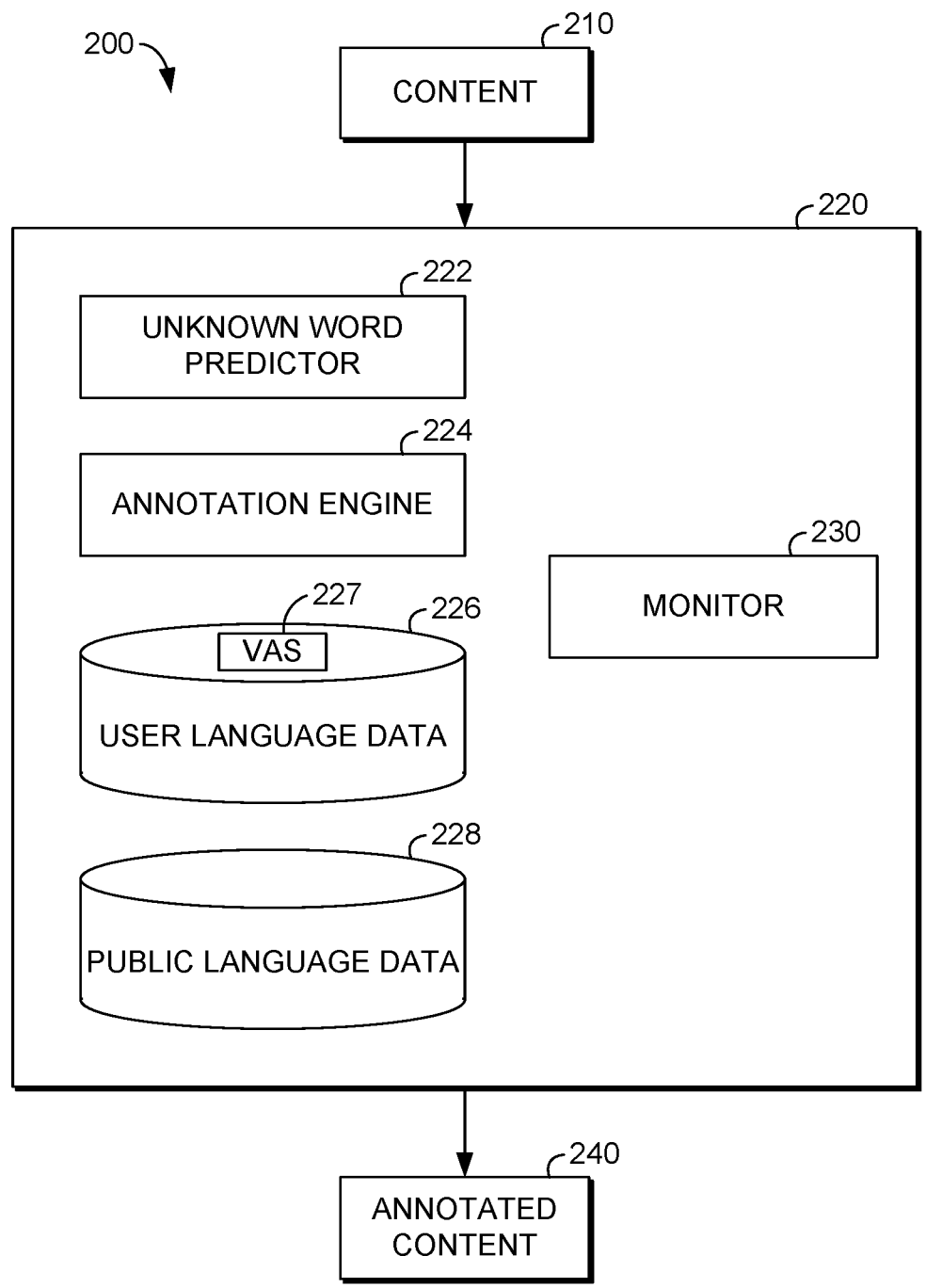
FIG. 2 is a diagram depicting an exemplary computing environment including an unknown word identification and annotation engine, in accordance with an aspect of the technology described herein.

Operating environment 100 can be utilized to implement one or more of the components of system 200, described in FIG. 2, including components for collecting user data, monitoring reading and writing events, generating annotations, and identifying unknown words.

Referring now to FIG. 2, in connection with FIG. 1, a block diagram is provided showing aspects of an example computing system architecture suitable for implementing an aspect of the technology described herein and designated generally as system 200. System 200 analyzes content, identifies words in the content that are likely unknown for a particular user at a point in time, and generates explanatory annotation for those unknown words. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location. For example, aspects of the vocabulary enrichment component 220 could be located on different computing devices or could all be located on the same device.

Example system 200 includes network 110, which is described in connection to FIG. 1, and which communicatively couples components of system 200, including vocabulary enrichment component 220. Vocabulary enrichment component 220 (including its components 222, 224, 226, 227, 228, and 230) may be embodied as a set of compiled computer instructions or functions, program modules, data models, databases, data stores, computer software services, or an arrangement of processes carried out on one or more computer systems, such as computing device 1000 described in connection to FIG. 10, for example.

In one aspect, the functions performed by components of system 200 are associated with one or more applications, services, or routines. In particular, such applications, services, or routines may operate on one or more user devices (such as user device 102*a*), servers (such as server 106), may be distributed across one or more user devices and servers, or be implemented in the cloud. Moreover, in some aspects, these components of system 200 may be distributed across a network, including one or more servers (such as server 106) and client devices (such as user device 102*a*), in the cloud, or may reside on a user device, such as user device 102*a*. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

The vocabulary enrichment component 220 can receive or retrieve content 210 for identification of unknown words upon receiving an indication that the user is accessing content. For example, the vocabulary enrichment component 220 could access website content upon receiving an indication that the user has navigated to a website along with the URL of the site or a URI. Similarly, the vocabulary enrichment component 220 can access text in a book opened in an e-reader application. The content could be a web page, a social post, a book, an audio recording comprising speech, a video recording comprising speech, a presentation, a document, a user interface, or similar.

In the case of an audio recording or video recording, a natural language processing component can be used to perform speech-to-text conversion. The vocabulary enrichment component 220 can then analyze the text to generate a list of potential unknown words and provide an annotation or other form of comprehension assistance. In the case of video content, the annotation could take the form of overlaid text or rich text aligned with the exact moment of the appearance of the unknown word in the video. In the case of audio content, the annotation can take the form of subtitles aligned with the exact moment of the appearance of the unknown word in the audio.

The vocabulary enrichment component 220 includes an unknown word predictor 222, an annotation engine 224, a user language data store 226, a public language data store 228, and a user activity monitor 230. These components can work together to identify words that are potentially unknown to the user and generate annotations within the content that can allow the user to better understand unknown words within the particular context. The annotations can be presented within annotated content 240. Examples of annotated content are provided below with reference to FIGS. 3-7.

Turning now to FIG. 3, a content display comprising visually distinguished unknown words is illustrated, in accordance with an aspect of the technology described herein. The content 300, which in this case comprises the first few paragraphs of the novel Moby Dick, includes several words which are underlined to provide a visual indication that a comprehension aid can be accessed through selection of the word. The visually distinguished words in the content 300 include the word "spleen" 310, "flourish" 312, "Cato" 314, "insular" 316, "Manhattoes" 318, "circumambulate" 320, and "sentinels" 322. While underlining is used in this example, other methods of visually distinguishing words are possible. For example, a word can be visually distinguished by its font, color, size, underlining, double underlining, and other visible characteristics to indicate that the word is selectable.

The visually distinguished words in the example of FIG. 3 are not selected randomly or for a general audience. Instead, the visually distinguished words are selected based on knowledge of an individual viewer's vocabulary that indicates the word is likely to be unknown to the particular user. As used herein, unknown means the user is unclear about the definition or meaning of a word or phrase. The user could have seen a word previously and the word could still be unknown.

A word's status as potentially known or unknown to a user can change over time. An unknown word can become known as the user encounters or uses the word. For example, a given user consuming the exact same content (for instance, an article) at different times might get different predicted unknown words. A word's status can change because the user might have become familiar with some of the initially predicted unknown words (consumed them through additional content, used them while authoring a document etc.). In such case, the system has tracked the fact that the user has used these initially unknown words and has characterized the words as known in the present time. Thus, the same user consuming the same article a few months later may get different predictions for potentially unknown words.

Any two users consuming the exact same content (for instance an article) may get different predicted unknown words and potentially different synonyms, links and visual help via the annotation engine 224 based on each user's unique usage an exposure data. FIGS. 4, 5, and 6 illustrate different comprehension aids or invitations that can be accessed through selecting a visually distinguished word.

Turning now to FIG. 4, an explanatory annotation 330 is illustrated, in accordance with aspects of the technology described herein. An explanatory annotation provides information about a person, a place, an entity or thing. Upon a user selecting the visually distinguished word "Manhattoes" 318, an explanation 332 of the Manhattoes is provided in the explanatory annotation 330. In this case, the explanation is, "Manhattan: A borough of New York City." In addition, Manhattan 334 is underlined indicating that the word Manhattan is selectable and could lead (e.g., links/URIs to specific documents or online resources (for instance Wikipedia)) to further details about Manhattan. In one aspect, explanatory annotations include links back to source content where further information can be accessed. For example, the link could be to a Wikipedia entry or a knowledge base entry that provides additional information about Manhattan.

Turning now to FIG. 5, a definitional annotation 340 is provided, in accordance with an aspect of the technology described herein. Definitional annotations provide a definition of a word. When the word has multiple definitions, the context in which the word is used within the content 300 can be considered. For example, the usage of the word as a noun, verb, adjective, or some other part of speech could be determined to select a definition that is most likely to reflect an author's intended use of the word. In this example, the definitional annotation 340 can be surfaced upon the user's selection of the word "circumambulate" 320. The definition 342 of circumambulate 320 is "to walk all the way around something." The definition could be accessed from a dictionary in order to generate the annotation. In one aspect, the definitional annotation 340 includes a link to source content, such as an online dictionary.

As an alternative to a definition, an example annotation (not shown) could be provided. The system can retrieve real examples of the unknown word being used, from the content consumed across users, geographies, and context. The system can select the most relevant and/or most popular examples. The example can be a complete sentence using the particular word. Examples could also be pulled from a knowledge base, such as a usage guide or dictionary.

Turning now to FIG. 6, a translation annotation and synonym annotation is provided, in accordance with an aspect of the technology described herein. In this case, the single annotation 350 includes both a translation into a different language and synonyms of the unknown word in the unknown word's language. The annotation 350 can be surfaced upon the user's selection of the unknown word "sentinels" 322. The annotation 350 includes a translation of "sentinels" into Greek 352, as well as English language synonyms 354. A translation can be provided when aspects of the technology determine that a specific user speaks more than one language. For example, the technology can determine that a user is familiar with more than one language when the user is observed reading text in different languages or writing in different languages. For example, the specific user that is viewing the content 300 may speak English as a second language and Greek as a first language. In this case, providing a translation 352 of an unknown word in a secondary language into the user's first language can be a helpful comprehension aid. Aspects of the technology are not limited to any particular language or alphabet. For example, "sentinels" could have been translated into Spanish as "centinela" if the viewer is determined to know Spanish. The synonyms 354 are provided in the same language as the base content 300, which in this example is English. Both the translation 352 and the synonyms 354 could be linked to a source content, or alternative translations or additional synonyms could be accessed.

The annotations can be provided in the same language as the content or a different language. For example, the content could be in Spanish and the annotations presented in English. The language of the annotations can be selected by the user through a preferences interface. Alternatively, the system can learn the languages understood by an individual person, derive preferences from observing user events, and select the language of the annotation accordingly. For example, a user that typically looks English words up in an English language dictionary may receive English language annotations when reading English language content. In contrast, a user that typically seeks translations of English words into Spanish may receive Spanish language annotations when reading English content. In one aspect, a translation of an unknown word from a first language into a user's native language (or any language with which the user has a higher fluency level than the content language) is provided when all available synonyms in the first language are also likely unknown to the user. The user's known languages can be explicitly provided by the user or learned by observing the language of content the user consumes or composes.

Alternatively, the annotations can provide content in multiple languages. For example, the annotation could provide a contextual synonym of an unknown English word in English and a French translation of the unknown English word. The annotation can provide content in a language the reader understands well and a second language in which the reader is less fluent.

Returning to the description of FIG. 2, the unknown word predictor 222 identifies words within the content 210 that are likely unknown for the given user and point in time. As a first step, the unknown word predictor 222 can use a broad filter to identify potentially unknown words. For example, words that have above a threshold frequency of usage within a language could be excluded as potentially unknown words. In one aspect, the filter is user specific. For example, the filter could be generally applied based on a reading level associated with the user. The reading level could be calculated based on an on-going analysis of the user's reading content, reading speed, and vocabulary usage when drafting communications.

In an aspect, the potentially unknown words are then fed into a machine classifier that calculates a confidence score indicating whether the word is unknown to the particular user at the specific time. The machine classifier can receive a plurality of signals related to the user and the public as input to determine whether a word is unknown. The machine classifier can utilize one or more of a neural network, support vector machine, generalized linear modeling, data mining, text mining, natural language processing algorithms, regression, or decision tree in some configurations could be used in isolation or in combination as part of the machine classifier, to calculate a confidence score or otherwise classify a word on a known/unknown spectrum.

In one aspect, a signal comprises reading data. The reading data can include text from content read by the user, a classification of content read by the user, reading analytics, and other data related to the user's reading habits. The classification of content can be by reading level, subject matter, source type, or other factor. The reading level can be determined editorially, for example, as determined by a knowledge base describing the reading level of various books. The reading level could also be determined analytically by analyzing sentence length, sentence complexity, and the complexity of the vocabulary used. The subject matter could be determined through analysis of a knowledge base for known works, such as books. Subject matter could also be ascertained by evaluating metadata associated with various content, such as a web page. Subject matter could also be directly determined through a classification method that considers the content and source of a text. The subject matter can be used to define an interest of the user. For example, a user could be classified as having one or more interests, such as sports, religion, politics, music, or similar. Different levels of granularity are possible. Instead of sports, a user could be classified as having an interest in baseball, soccer, football, basketball, track, or hockey.

In another aspect, the signal data includes composition or drafting data. The composition drafting data can include the text of emails, social posts, documents, presentations, and other communications and documents generated by the user.

In another aspect, the signal data includes looked up words. Looked up words are those that the user searched for additional information about or translation of. For example, the user could have looked up a word in an online dictionary or translation service. The user could have searched for a word through a search engine, online dictionary, or personal assistant application.

The signals can also include user feedback. User feedback can be explicit or implicit. Implicit feedback can include user interactions with annotations presented to the user previously. For example, when a word is identified as unknown and associated with an annotation that is ignored (e.g., not used, not consumed, no interaction) by the user, the non-interaction can be implicit feedback that implies the user is familiar with the word. Similarly, interaction with an unknown word to access an annotation suggests that the word is correctly identified as unknown. Explicit feedback could be provided through a mechanism made available in an annotation. For example, a selectable "remove" command could be provided within an annotation that if selected causes the associated unknown word to be removed from the phrasebook and classified as known. In this aspect, words that are explicitly identified as known can be used as a signal.

With all the above signals, the frequency and recentness of exposure to or usage of various words can be determined and used as an input to the machine classifier. Other derived signals are possible. Derived signals are calculated by performing an operation on raw signal data.

The machine classifier portion of the unknown word predictor 222 generates a list of unknown words. The machine classifier can use any type of technology or combination of technology capable of determining whether a word is known or unknown. The determination can be binary or expressed as a confidence factor describing a probability a word is unknown. For example, a neural network, support vector machine, generalized linear modeling, data mining, text mining, natural language processing algorithms, regression, or decision tree in some configurations could be used in isolation or in combination as part of the machine classifier. The unknown words from the content can be added to a phrasebook that includes both known and unknown words. Words determined to be unknown can be an input to subsequent determinations. The unknown words can be communicated to the annotation engine 224.

The annotation engine 224 can change the appearance of unknown words within a displayed content as illustrated previously with reference to FIGS. 3-6. Different methods are available for changing the appearance of a word. For example, when aspects of the technology described herein interact with a web browser, the technology may update the document object model to change the appearance of content to have unknown words underlined, or otherwise visibly differentiated from the rest of the text.

The annotation engine 224 can also build an annotation that is displayed in response to selecting or otherwise interacting with an unknown word. The annotations can include an explanation of a person, place, entity, or thing; a definition of a word; a usage of a word in a sentence; a translation of a word into a different language; synonyms; contextual synonyms; usage examples; or some other form of comprehension aid. The annotations can be built from outside sources, such as online dictionaries, web pages, and knowledge bases. The annotation could also be powered by the internal knowledge base/content analytics store providing real examples of use of particular words in real content. The annotation can include a link to online sources used to build the annotation or other online sources that may be relevant to provide additional information about an unknown word or phrase. The output of the annotation engine 224 is an annotated content 240.

In one variation, the annotation engine 224 replaces words within the content with other words having the same or similar meaning. In one aspect, unknown words are replaced with known words. The known words can be visibly designated as selectable. Upon selection, an annotation could be displayed showing the original unknown word. The opposite approach is also possible. A known word that is a synonym of an unknown word could be replaced with the unknown word. This gives the opportunity for the user to be exposed to the unknown word. In this case, a general list of unknown words for a specific user, such as those found in a phrasebook associated with the user, could be used to generate a list of synonyms for these words. The synonyms could be compared to words within the content.

In another variation, the user can request unknown synonyms to a known word. In one aspect, words with available unknown synonyms could be made selectable. In another aspect, the user can identify a word and request unknown synonyms even though the word was not selectable or otherwise visually distinguished.

In one aspect, a contextual synonym can be selected. A contextual synonym shares a context with the unknown word. For example, sports can be the context of a baseball website and politics could be the context of a political website or social post related to politics. The context of an unknown word can be determined by words in the content, the source of the content, metadata associated with the content, and other information. The context can be determined at various levels of granularity. For example, the context could be sports or it could be baseball, football, basketball, etc.

The context of the various synonyms can be derived from a definition of the word or usage examples provided in a knowledge base. The subject matter can also be determined by analyzing the frequency of occurrence in content having the same context. For example, a synonym for an unknown word occurring in a sports article could be selected from among many available synonyms based on a frequency of occurrence within a corpus of sports articles compared to the frequency other synonyms are used in the sports context. In addition to synonyms, aspects of the technology can replace acronyms or slang with contextual synonyms, or other comprehension aids.

The frequency of overall usage could also be considered when selecting a contextual synonym. So a synonym that does not occur frequently in general, but is used at a much higher rate in sports articles could be selected in the sports context, especially if the viewer shows familiarity with sports articles. In one aspect, only synonyms that are likely to be known to a user are evaluated for affinity with a particular context.

The user language data store 226 can include raw language data gathered by the user activity monitor 230. The raw language data can include a user's reading data and reading patterns. The raw language data can include knowledge about an individual user, such as the languages used by the user and proficiency the user has in each language. The user language data store 226 can also include a phrasebook that lists recently looked up words. In one aspect, the phrasebook can be part of the Vocabulary Analytics Store (VAS) 227.

The VAS 227 can comprise a subset of user-specific language data. The subset can include all of the signals described previously as input to the machine classifier or other statistical modeling technique.

The public language data store 228 can comprise usage patterns within a general population or specific subsets of the general population. As mentioned, the subsets can be classified by audience data defined by demographic information such as age, income, geographic location, nationality, gender, profession, educational level, life-style related attributes or other factor. The audience can also be defined by interest in various subject matter categories. The public language data store can also include dictionaries and other knowledge bases that provide information about grammar and relationships between words. Words can be grouped by meaning, usage commonality, or user interest associated with context.

The user monitor 230 can exist on multiple user devices and generate the user reading data that is used to determine whether words are known or unknown. The user monitor 230 can generate a series of records or entries of every reading or composition event (including words, statistics, or metadata). The user monitor 230 can generate implicit feedback regarding user interactions with annotations provided. The user monitor 230 can rely on information provided by other applications to generate reading statistics or implements technology to generate such statistics. For example, the user monitor 230 could rely on a gaze detection technology to determine processing time on various words and phrases and then make a record of words or phrases that seem to slow down the user's reading. The user monitor 230 could access an application program interface provided by the reader to determine what the user is reading and how fast the user is reading a given book or other content.

Figure 7:
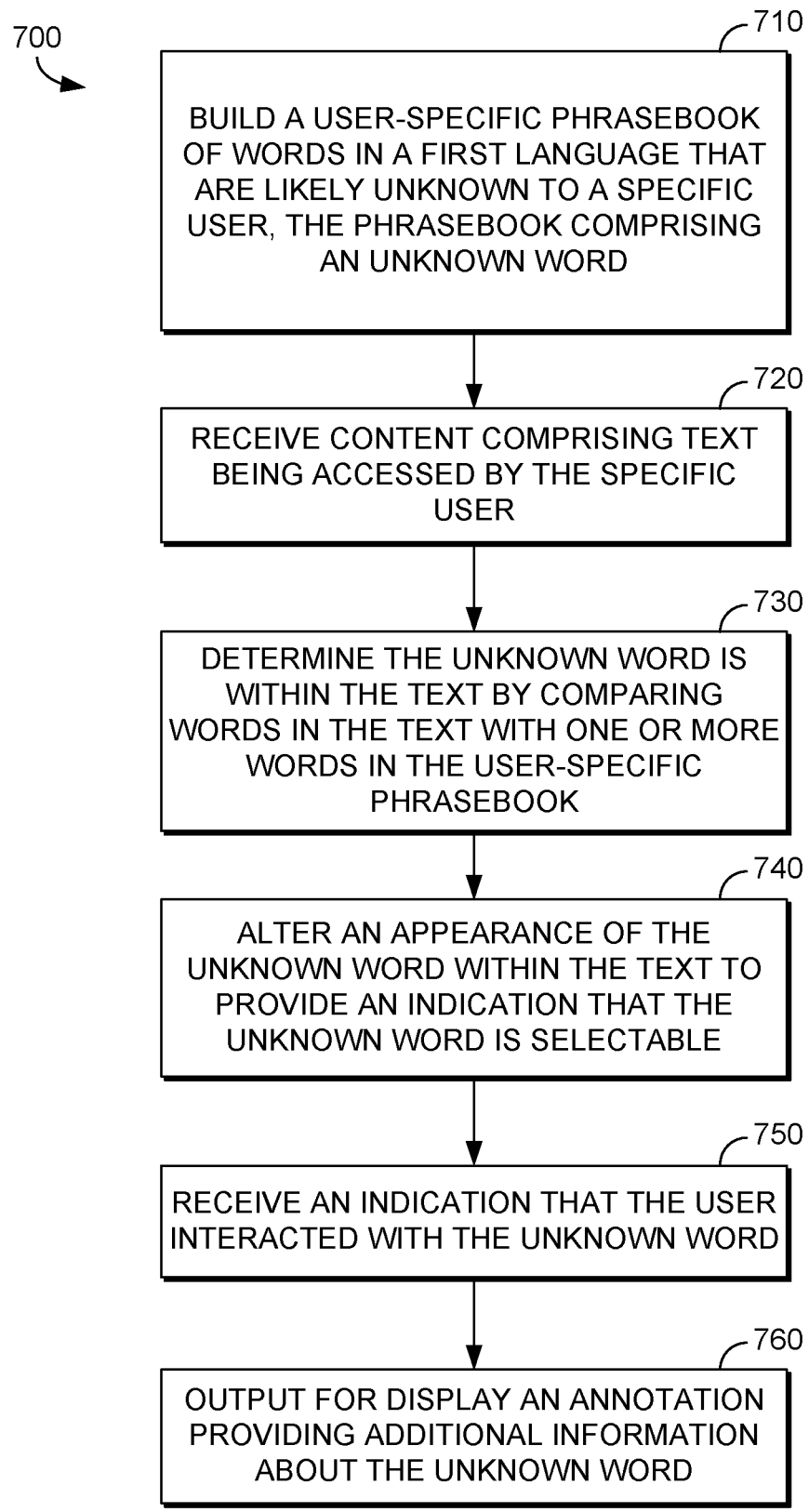
FIG. 7 is a diagram depicting a method generating a language comprehension aid, in accordance with an aspect of the technology described herein.

Turning now to FIG. 7, a method 700 of generating a language comprehension aid is described, according to an aspect of the technology described herein. Method 700 could be performed by a system similar to the vocabulary enrichment component 220.

At step 710, a user-specific phrasebook of words is built. The words are in a first language and are likely unknown to a specific user. The words in the phrasebook are unknown words to the user at a point in time and can change over time. In one aspect, words that are searched by the user are added to the phrasebook. For example, words looked up in a dictionary or submitted to a translation service could be included in the phrasebook. The phrasebook can also include words that are determined to be unknown to the user by a machine classifier, as explained with reference to FIG. 2. For example, a content could be evaluated by the machine classifier to determine unknown words. Some or all of those words could be annotated in the content, but also added to the phrasebook. In one aspect, the phrasebook can include words that are expected be unknown based on demographic information about the user.

At step 720, a content comprising text being accessed by the specific user is received. The content could be a web page, a social post, a book, an audio recording comprising speech, a video recording comprising speech, a presentation, a document, a user interface, or similar. In the case of an audio recording or video recording, a natural language processing component can be used to perform speech-to-text conversion. In one aspect, the content is intercepted by a browser plug-in for analysis upon the user navigating to a web page. The plug-in could perform the analysis or communicate the content to another component installed on a client device or server for analysis. A document application, presentation application, e-reader, or other content application could similarly retrieve content for analysis.

At step 730, an unknown word from the user-specific phrasebook is determined to be within the text by comparing words in the text with the words in the user-specific phrasebook. In one aspect, each word in the text is compared against words in the phrasebook to determine whether the word is likely unknown. The unknown word can then be marked as unknown.

At step 740, an appearance of the unknown word within the content is altered to provide an indication that the unknown word is selectable. Various ways to alter the appearance of the unknown word include changing its color, underlining it, double underlining it, and such. In one aspect, the appearance is changed by adding a link to the unknown word and the appearance is automatically changed according to display properties within an application displaying the content. For example, a document application may change the color of every linked word from black to blue.

At step 750, an indication that a user interacted with the unknown word is received. The user can interact with the word on a touchscreen, with a speech command or gesture, using a mouse or touchpad, or through some other method. Selection of the word is one example of an interaction and hovering over the word is another.

At step 760, an annotation providing additional information about the unknown word is output for display. The annotations can include an explanation of a person, place, entity, or thing; a definition of a word; a usage of a word in a sentence; a translation of a word into a different language; synonyms; or some other form of comprehension aid. The annotations can be built from outside sources, such as online dictionaries, web pages, and knowledge bases. The annotation can include a link to online sources used to build the annotation or other online sources that may be relevant to provide additional information about an unknown word or phrase.

In one variation, the technology described herein replaces words within the content with other words having the same or similar meaning. In one aspect, unknown words are replaced with known words. The known words can be visibly designated as selectable. Upon selection, an annotation could be displayed showing the original unknown word. The opposite approach is also possible. A known word that is a synonym of an unknown word could be replaced with the unknown word. This gives the opportunity for the user to be exposed to the unknown word. In this case, a general list of unknown words for a specific user, such as those found in a phrasebook associated with the user, could be used to generate a list of synonyms for these words. The synonyms could be compared to words within the content.

In another variation, the user can request unknown synonyms to a known word. In one aspect, words with available unknown synonyms could be made selectable. In another aspect, the user can identify a word and request unknown synonyms even though the word was not selectable or otherwise visually distinguished.

In one aspect, a contextual synonym can be selected. A contextual synonym shares a context with the unknown word. For example, sports can be the context of a baseball website and politics could be the context of a political website or social post related to politics. The context of an unknown word can be determined by words in the content, the source of the content, metadata associated with the content, and other information. The context can be determined at various levels of granularity. For example, the context could be sports or it could be baseball, football, basketball, etc.

The context of the various synonyms can be derived from a definition of the word or usage examples provided in a knowledge base. The subject matter can also be determined by analyzing the frequency of occurrence in content having the same context. For example, a synonym for an unknown word occurring in a sports article could be selected from among many available synonyms based on a frequency of occurrence within a corpus of sports articles compared to the frequency other synonyms are used in the sports context. In addition to synonyms, aspects of the technology can replace acronyms or slang with contextual synonyms, or other comprehension aids.

The frequency of overall usage could also be considered when selecting a contextual synonym. So a synonym that does not occur frequently in general, but is used at a much higher rate in sports articles could be selected in the sports context, especially if the viewer shows familiarity with sports articles. In one aspect, only synonyms that are likely to be known to a user are evaluated for affinity with a particular context.

Figure 8:
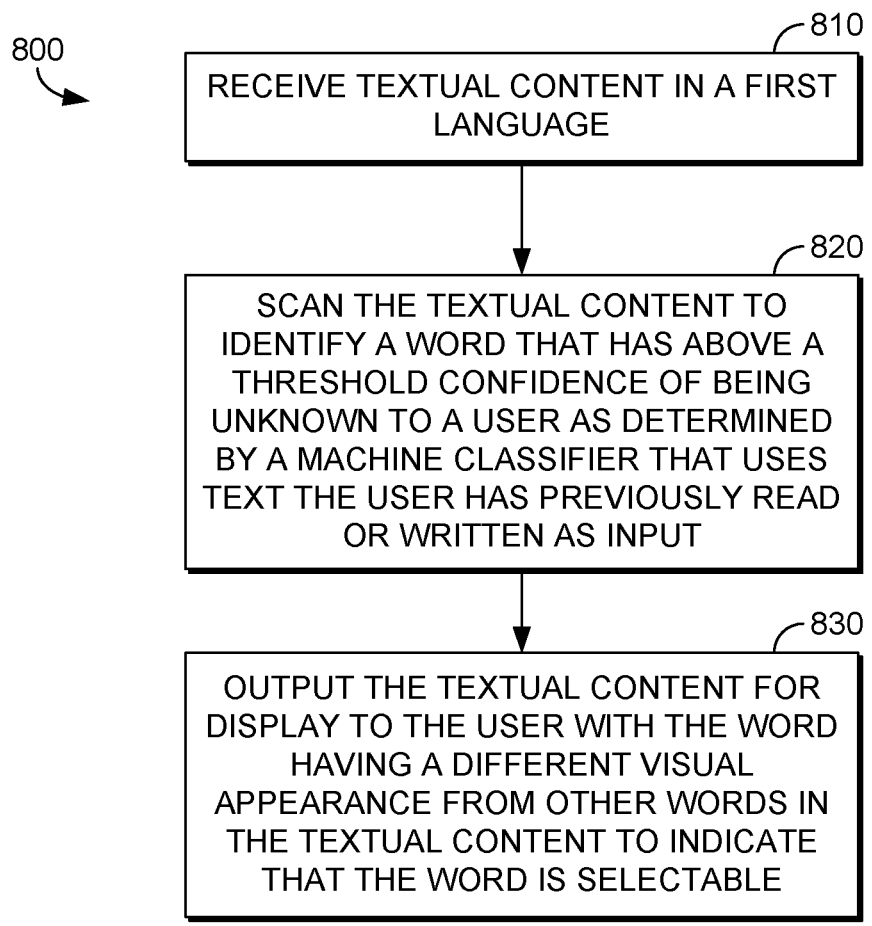
FIG. 8 is a diagram depicting a method generating a language comprehension aid, in accordance with an aspect of the technology described herein.

Turning now to FIG. 8, a method 800 of generating a language comprehension aid is described, according to an aspect of the technology described herein. Method 800 could be performed by a system similar to the vocabulary enrichment component 220.

At step 810, a textual content in a first language is received. The content could be a web page, a social post, a book, an audio recording comprising speech, a video recording comprising speech, a presentation, a document, a user interface, or similar. In the case of an audio recording or video recording, a natural language processing component can be used to perform speech-to-text conversion. In one aspect, the content is intercepted by a browser plug-in or extension for analysis upon the user navigating to a web page. The plug-in could perform the analysis or communicate the content to another component installed on a client device or server for analysis. A document application, presentation application, e-reader, or other content application could similarly retrieve content for analysis.

At step 820, the textual content is scanned to identify a word that has above a threshold confidence of being unknown to a user as determined by a machine classifier that uses text the user has previously read or written as input. In one implementation this can be done just-in-time. In another implementation, the unknown word estimations happen periodically or are triggered by specific events. For example, when new content is being consumed words can be checked against the unknown word estimations.

At step 830, output the textual content for display to the user with the word having a different visual appearance from other words in the textual content to indicate that the word is selectable. Various ways to alter the appearance of the unknown word include changing its color, underlining it, double underlining it, and such. In one aspect, the appearance is changed by adding a link to the unknown word and the appearance is automatically changed according to display properties within an application displaying the content. For example, a document application may change the color of every linked word from black to blue. The use could select or otherwise interact with the word to receive an annotation, such as those described previously with reference to FIGS. 2-6. The annotation can provide comprehension assistance, for example, a translation, definition, usage examples, or contextual synonym for an unknown word.

Figure 9:
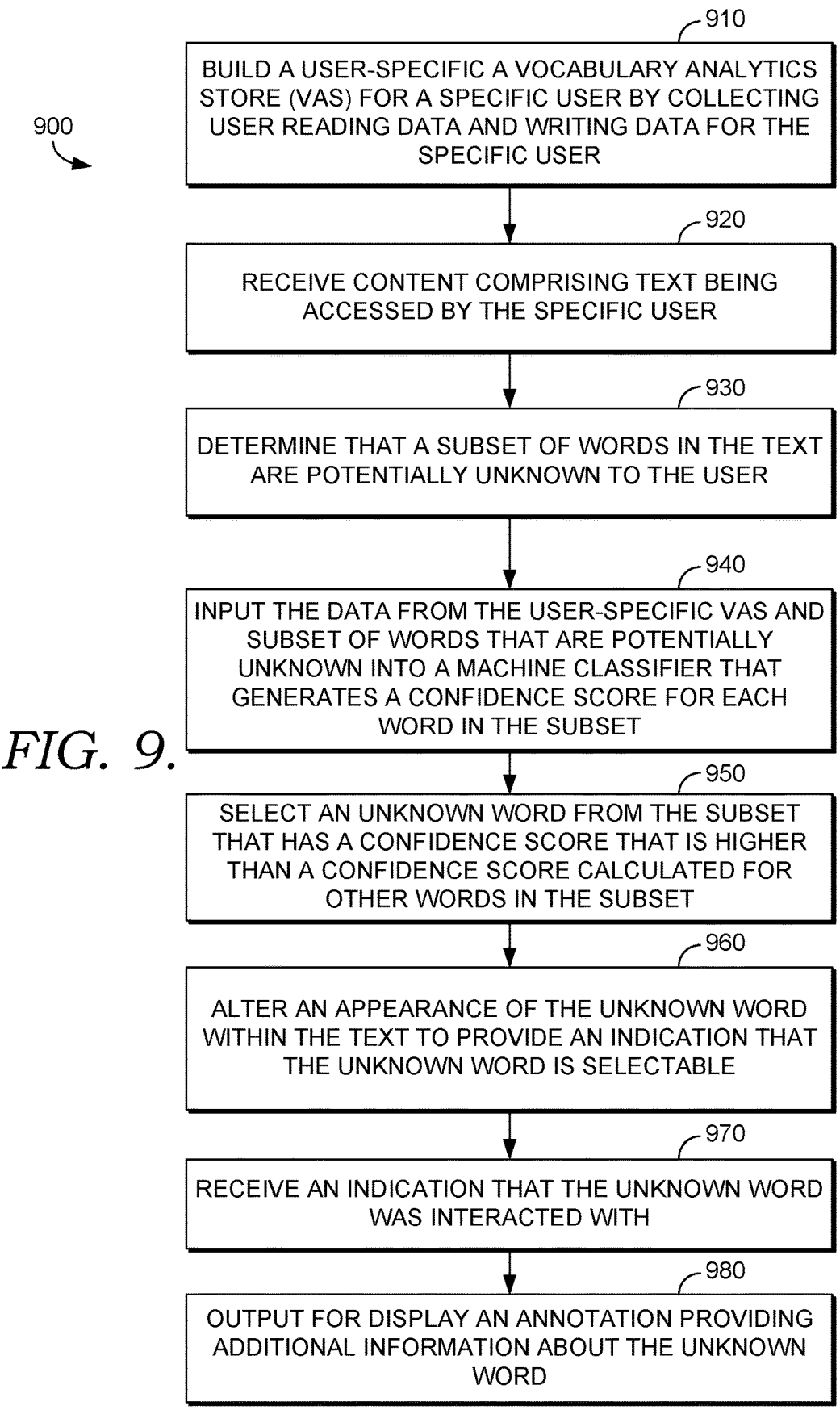
FIG. 9 is a diagram depicting a method generating a language comprehension aid, in accordance with an aspect of the technology described herein.

Turning now to FIG. 9, a method 900 of generating a language comprehension aid is described, according to an aspect of the technology described herein. Method 900 could be performed by a system similar to the vocabulary enrichment component 220.

At step 910, a user-specific vocabulary analytics store (VAS) is built for a specific user by collecting reading data and writing data for the specific user. User's actions, including text composition, through the user devices can be monitored to build a user-specific VAS. The user's actions across multiple devices can be compiled into a single record. For example, the user can read a book or a web page through an application on the user device. This reading activity can form part of a reading record. Similarly, the user could draft emails or other documents which can be used to determine the user's vocabulary and ultimately determine whether other words are known or unknown.

The VAS is a knowledge base describing—in terms of patterns, stats, specific word listing, frequencies and contextual data—how the user is using one or more languages (and the progress/change of this usage over time). The VAS can also host records of translation requests the user is making to one or more connected dictionary/translation services. The requested words can be entered in a phrasebook that can be part of or separate from the VAS. The phrasebook can also be populated with words determined to be unknown to the user by a machine classifier. As used herein, the phrase machine classifier can include any statistical modeling techniques suitable for the purpose of determining whether words are known or unknown to a person. The VAS may also host or connect to publicly available stats and metadata on certain words and the usage rates of words by specific audiences. Audience can be defined by various demographic characteristics such as geographic location. For example, the usage rate of certain words in the English language can differ significantly between people located in Australia and people located in the United States. Significant differences can exist between regions within a country. Audiences can be defined based on age as generational differences can exist for word usage. Audiences can also be defined by profession. For example, doctors, lawyers, computer programmers, and psychologists may have familiarity with individual words common to the profession.

Audiences can also be defined by interests. For example, sports lovers may have a deep understanding of words used in the sport context, whereas political junkies may have a deep understanding of words used in the political context but have a rather shallow understanding of words used in the sports context. User data, including reading logs, can be used to determine user interests. Words can similarly be associated with a context. Even though a sports fanatic may not have been exposed to or used a specific word, such as southpaw, the sports fanatic is more likely to know the meaning of southpaw (e.g., left-handed pitcher) than a person that is not a sports fanatic. Accordingly, a statistical classifier using context as input could assign a lower confidence that the word "southpaw" is unknown to a sports fanatic than a non-sports fanatic even given the same level of exposure and use by the two people.

The user's VAS can be maintained and kept in the background, as the source of data and signals enabling unknown word prediction for the user: the wealth of information provided in the VAS can be used to predict—with a known level of confidence—if any given word is expected to be known to the user or not. In other words, the VAS's content can be used as input to the classifier to calculate at a confidence level that a given word is known or unknown. If a word is classified as unknown and the user is opening content (for instance, an article) containing this word, then the system enriches the original content with an annotation served in-line, on the unknown word, within the article. This happens smoothly with no request or action from the user. Aspects of the technology are not limited to use with a binary classifier. For example, a multi-class classifier could be used to classify a word into one of several different classes such as known, familiar, and un-known. In other cases, a classifier could assign a numeric value between 0 and 1 (for example) indicating the level of user familiarity with the particular word at a particular point in time.

In one aspect, a binary classification machine is used to classify words as either known or unknown. As a preliminary step, words having above a threshold commonality or usage frequency within a language can be excluded from the analysis and designated as known. For example, words like "the," "you," "him," and "her" are widely used and known in the English language. The binary classification machine can be trained to analyze user data in the VAS related to vocabulary knowledge, such as the texts of content read or written, dwell time on pages of text, and reading analytics derived from technology, such as gaze detection where the time spent on individual words can be measured. Gaze detection tracks eye movement on a page or screen using a camera(s). Coming back to a particular word or appearing to stumble over a word can indicate that a word is unknown to the user. The classification machine can also utilize audience data, as described previously. The user can be associated with or assigned to one or more audience profiles or specific demographic segments. These profiles or segments can provide additional input to the classifier and be used to determine whether a word is likely known or unknown.

The user segments or profiles can be used to set up an initial language profile for a user that can be modified as additional activity is received. Having no or limited content consumption data for a particular user, but knowing the geographic location, profession, age group, gender, social preferences and activity (for instance sports page likes, tweets etc.) can associate the user with a particular demographics segment, which is then used to initially set the expected known words for the user. The segment and profile data can be combined with actual content consumption data for the user, authoring activity, communication history data etc., to update the person's expected vocabulary.

Looking a word up in a dictionary, through a translation service, through a personal assistant application, search page, or other technology can also strongly indicate that a word is unknown, at first. In other words, the technology may assume that a recently looked up word is unknown and provide an annotation when the word occurs in future text. As the word is used by the user or the user is exposed to it multiple times, the classification may change to known. In one aspect, recently looked up words by the user are automatically added to the phrasebook. As another scenario, the system may use the recently looked-up word as an annotation to a synonym of the unknown word. This scenario helps the user learn the recently looked-up word by associating it to synonyms known to the user.

Other sources of information about a user's knowledge of a language can include spelling and grammar errors made while composing a document, email, and such. In one aspect, the technology collects instances where spelling or grammar errors were auto-corrected or manually corrected by a user.

At step 920, a content comprising text being accessed by the specific user is received. The content could be a web page, a social post, a book, an audio recording comprising speech, a video recording comprising speech, a presentation, a document, a user interface, or similar. In the case of an audio recording or video recording, a natural language processing component can be used to perform speech-to-text conversion. In one aspect, the content is intercepted by a browser plug-in for analysis upon the user navigating to a web page. The plug-in could perform the analysis or communicate the content to another component installed on a client device or server for analysis. A document application, presentation application, e-reader, or other content application could similarly retrieve content for analysis.

At step 930, a subset of words in the text are determined to be potentially unknown to the user. The technology described herein can use a broad filter to identify the subset of potentially unknown words. For example, words that have above a threshold frequency of usage within a language could be excluded as potentially unknown words. In one aspect, the filter is user specific. For example, the filter could be generally applied based on a reading level associated with the user. The reading level could be calculated based on an analysis of the user's reading content, reading speed, and vocabulary usage when drafting communications.

At step 940, the data from the user-specific VAS and the subset of words that are potentially unknown are input into a machine classifier that generates a confidence score for each word in the subset. The confidence score indicates whether a word is likely unknown to the specific user. The machine classifier can receive a plurality of signals from the VAS related to the user and the public as input to determine whether a word is unknown. The machine classifier can utilize one or more of a neural network, support vector machine, generalized linear modeling, data mining, text mining, natural language processing algorithms, regression, or decision tree in some configurations could be used in isolation or in combination as part of the machine classifier, to calculate a confidence score or otherwise classify a word on a known/unknown spectrum.

In one aspect, a signal comprises reading data. The reading data can include text from content read by the user, a classification of content read by the user, reading analytics, and other data related to the user's reading habits. The classification of content can be by reading level, subject matter, source type, or other factor. The reading level can be determined editorially, for example, as determined by a knowledge base describing the reading level of various books. The reading level could also be determined analytically by analyzing sentence length, sentence complexity, and the complexity of the vocabulary used. The subject matter could be determined through analysis of a knowledge base for known works, such as books. Subject matter could also be ascertained by evaluating metadata associated with various content, such as a web page. Subject matter could also be directly determined through a classification method that considers the content and source of a text. The subject matter can be used to define an interest of the user. For example, a user could be classified as having one or more interests, such as sports, religion, politics, music, or similar. Different levels of granularity are possible. Instead of sports, a user could be classified as having an interest in baseball, soccer, football, basketball, track, or hockey.

In another aspect, the signal data includes composition or drafting data. The composition drafting data can include the text of emails, social posts, documents, presentations, and other communications and documents generated by the user.

In another aspect, the signal data includes looked up words. Looked up words are those that the user searched for additional information about or translation of. For example, the user could have looked up a word in an online dictionary or translation service. The user could have searched for a word through a search engine, online dictionary, or personal assistant application.

The signals can also include user feedback. User feedback can be explicit or implicit. Implicit feedback can include user interactions with annotations presented to the user previously. For example, when a word is identified as unknown and associated with an annotation that is ignored (e.g., not used, not consumed, no interaction) by the user, the non-interaction can be implicit feedback that implies the user is familiar with the word. Similarly, interaction with an unknown word to access an annotation suggests that the word is correctly identified as unknown. Explicit feedback could be provided through a mechanism made available in an annotation. For example, a selectable "remove" command could be provided within an annotation that if selected causes the associated unknown word to be removed from the phrasebook and classified as known. In this aspect, words that are explicitly identified as known can be used as a signal.

With all the above signals, the frequency and recentness of exposure to or usage of various words can be determined and used as an input to the machine classifier. Other derived signals are possible. Derived signals are calculated by performing an operation on raw signal data.

The machine classifier generates a confidence score for each word evaluated. Words above a certain threshold confidence score could be designated as unknown. The machine classifier can use any type of technology or combination of technology capable of making a classification. For example, a neural network, support vector machine, data mining, or decision tree in some configurations could be used in isolation or in combination as part of the machine classifier. The unknown words from the content can be added to a phrasebook that includes unknown words. Words determined to be unknown can be an input to subsequent determinations.

At step 950, an unknown word is selected from the subset because it has a confidence score that is higher than a confidence score calculated for other words in the subset. In one aspect, the word with the highest confidence score is selected so long as the confidence score is above a threshold demarking the boundary between known and unknown words. In one aspect, all words above the threshold are selected. In another aspect, a limited number of words above the threshold are selected.

At step 960, an appearance of the unknown word within the content is altered to provide an indication that the unknown word is selectable. Various ways to alter the appearance of the unknown word include changing its color, underlining it, double underlining it, and such. In one aspect, the appearance is changed by adding a link to the unknown word and the appearance is automatically changed according to display properties within an application displaying the content. For example, a document application may change the color of every linked word from black to blue.

At step 970, an indication that the user interacted with the unknown word is received. The user can interact with the word on a touchscreen, with a speech command or gesture, using a mouse or touchpad, or through some other method. Selection of the word is one example of an interaction and hovering over the word is another.

At step 980, an annotation providing additional information about the unknown word is output for display. The annotations can include an explanation of a person, place, or thing; a definition of a word; a usage of a word in a sentence; a translation of a word into a different language; synonyms; or some other form of comprehension aid. The annotations can be built from outside sources, such as online dictionaries, web pages, and knowledge bases. The annotation can include a link to online sources used to build the annotation or other online sources that may be relevant to provide additional information about an unknown word or phrase.

In one variation, the technology described herein replaces words within the content with other words having the same or similar meaning. In one aspect, unknown words are replaced with known words. The known words can be visibly designated as selectable. Upon selection, an annotation could be displayed showing the original unknown word. The opposite approach is also possible. A known word that is a synonym of an unknown word could be replaced with the unknown word. This gives the opportunity for the user to be exposed to the unknown word. In this case, a general list of unknown words for a specific user, such as those found in a phrasebook associated with the user, could be used to generate a list of synonyms for these words. The synonyms could be compared to words within the content.

In another variation, the user can request unknown synonyms to a known word. In one aspect, words with available unknown synonyms could be made selectable. In another aspect, the user can identify a word and request unknown synonyms even though the word was not selectable or otherwise visually distinguished.

In one aspect, a contextual synonym can be selected. A contextual synonym shares a context with the unknown word. For example, sports can be the context of a baseball website and politics could be the context of a political website or social post related to politics. The context of an unknown word can be determined by words in the content, the source of the content, metadata associated with the content, and other information. The context can be determined at various levels of granularity. For example, the context could be sports or it could be baseball, football, basketball, etc.

The context of the various synonyms can be derived from a definition of the word or usage examples provided in a knowledge base. The subject matter can also be determined by analyzing the frequency of occurrence in content having the same context. For example, a synonym for an unknown word occurring in a sports article could be selected from among many available synonyms based on a frequency of occurrence within a corpus of sports articles compared to the frequency other synonyms are used in the sports context. In addition to synonyms, aspects of the technology can replace acronyms or slang with contextual synonyms, or other comprehension aids.

The frequency of overall usage could also be considered when selecting a contextual synonym. So a synonym that does not occur frequently in general, but is used at a much higher rate in sports articles could be selected in the sports context, especially if the viewer shows familiarity with sports articles. In one aspect, only synonyms that are likely to be known to a user are evaluated for affinity with a particular context.

The annotations can be provided in the same language as the content or in a different language. For example, the content could be in Spanish and the annotations presented in English. The language of the annotations can be selected by the user through a preferences interface. Alternatively, the system can learn the languages understood by an individual person, derive preferences from observing user events, and select the language of the annotation accordingly. For example, a user that typically looks English words up in an English language dictionary may receive English language annotations when reading English language content. In contrast, a user that typically seeks translations of English words into Spanish may receive Spanish language annotations when reading English content. In one aspect, a translation of an unknown word from a first language into a user's native language (or any language with which the user has a higher fluency level than the content language) is provided when all available synonyms in the first language are also likely unknown to the user. The user's known languages can be explicitly provided by the user or learned by observing the language of content the user consumes or composes.

Alternatively, the annotations can provide content in multiple languages. For example, the annotation could provide a contextual synonym of an unknown English word in English and a French translation of the unknown English word. The annotation can provide content in a language the reader understands well and a second language in which the reader is less fluent.

Exemplary Operating Environment

Figure 10:
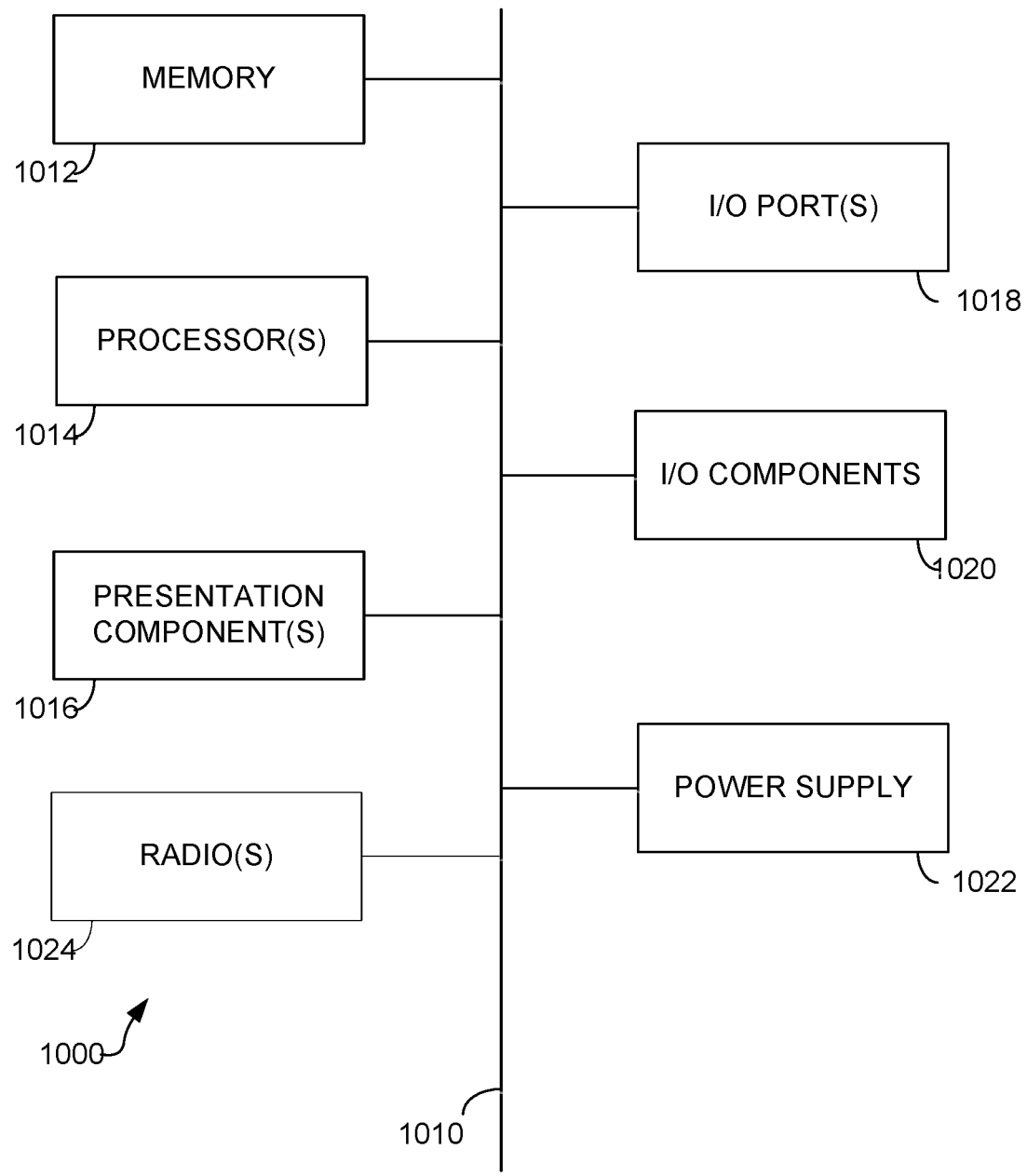
FIG. 10 is a block diagram of an exemplary computing environment suitable for implementing aspects of the technology described herein.

Referring to the drawings in general, and initially to FIG. 10 in particular, an exemplary operating environment for implementing aspects of the technology described herein is shown and designated generally as computing device 1000. Computing device 1000 is but one example of a suitable computing environment and is not intended to suggest any limitation as to the scope of use of the technology described herein. Neither should the computing device 1000 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1020, and an illustrative power supply 1022. Bus 1010 represents what may be one or more busses (such as an address bus, data bus, or a combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 10 and refer to "computer" or "computing device." The computing device 1000 may be a PC, a tablet, a smartphone, virtual reality headwear, augmented reality headwear, a game console, and such.

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or nonvolatile memory. The memory 1012 may be removable, non-removable, or a combination thereof. Exemplary memory includes solid-state memory, hard drives, optical-disc drives, etc. Computing device 1000 includes one or more processors 1014 that read data from various entities such as bus 1010, memory 1012, or I/O components 1020. Presentation component(s) 1016 present data indications to a user or other device. Exemplary presentation components 1016 include a display device, speaker, printing component, vibrating component, etc. I/O ports 1018 allow computing device 1000 to be logically coupled to other devices, including I/O components 1020, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1000. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

The computing device 1000 may include a radio 1024. The radio transmits and receives radio communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A method of generating a language comprehension aid comprising:
    building a user-specific Vocabulary Analytics Store (VAS) that comprises a frequency with which a first set of words occurs within text written by a specific user and text read by the specific user;
    providing the VAS as input to a machine classifier that classifies a second set of words as known or unknown to the specific user, wherein a subset of the second set of words is classified as unknown to the specific user;
    populating a user-specific phrasebook of words in a first language with the subset that is classified as unknown to the specific user;
    receiving a content comprising text being accessed by the specific user;
    determining an unknown word is within the text by comparing words in the text with the words in the user-specific phrasebook;
    altering an appearance of the unknown word within the content wherein the unknown word having the altered appearance is selectable;
    receiving an indication of user interaction with the unknown word; and
    outputting for display an annotation providing additional information about the unknown word.

2. The method of claim 1, wherein the additional information is a translation of the unknown word into a second language.

3. The method of claim 1, wherein the annotation comprises a contextual synonym of the unknown word.

4. The method of claim 1, wherein the annotation comprises a definition of the unknown word or an example of the unknown word being used in a sentence.

5. The method of claim 4, wherein the method further comprises updating the VAS to include the specific user's interactions with the annotation.

6. The method of claim 4, wherein the method further comprises updating the VAS to include a user interest that can be used by the machine classifier to calculate a confidence score that a given word is unknown.

7. The method of claim 1, wherein the content is a web page.

8. A method of generating a language comprehension aide comprising:
    building a Vocabulary Analytics Store (VAS) that comprises a frequency with which words occur within text written by a user and text read by the user;
    receiving a textual content in a first language;
    determining a set of words the user has not been observed interacting with previously;
    providing the VAS and the set of words as input to a machine classifier that generates confidence scores for the set of words, wherein a particular confidence score for a particular word of the set of words indicates a likelihood that the particular word is unknown to the user;
    determining that word from the set of words in associated with a confidence score that satisfies a threshold;
    based on the confidence score satisfying the threshold, outputting the textual content for display to the user with the word having a different visual appearance from other words in the textual content to indicate that the word is selectable;
    receiving an indication of user interaction with the word; and
    outputting an annotation providing additional information about the word.

9. The method of claim 8, wherein the annotation is a translation of the word into a second language that is different from the first language, wherein a user profile for the user indicates that the user is familiar with the second language.

10. The method of claim 8, wherein the annotation comprises an explanation of the word from a knowledge base, wherein the word is one of a person, place, or thing.

11. The method of claim 8, wherein the annotation comprises a definition of the word or an example of the word being used in a sentence.

12. The method of claim 8, wherein the annotation comprises a contextual synonym of the word.

13. The method of claim 8, wherein the machine classifier further receives as input a record of words looked up by the user in an online dictionary.

14. The method of claim 8, wherein the annotation is output for display adjacent to the word.

15. One or more computer storage media having computer-executable instructions embodied thereon that when executed by a computing device performs a method of generating a language comprehension aid, the method comprising:
    building a user-specific Vocabulary Analytics Store (VAS) for a specific user, wherein the VAS comprises a frequency with which words occur within text written by the specific user and text read by the specific user by collecting user reading data and writing data for the specific user;
    receiving a content comprising text being accessed by the specific user;
    determining that a subset of words in the text are potentially unknown to the user, wherein the subset of words are words the specific user has not been observed interacting with previously;
    inputting the data from the user-specific VAS and the subset of words that are potentially unknown into a machine classifier that generates confidence scores for the subset of words, a particular confidence score for a particular word indicating whether the particular word is likely unknown to the specific user;
    selecting an unknown word from the subset that has a confidence score that is higher than confidence scores calculated for other words in the subset;
    altering an appearance of the unknown word within the content to provide an indication that the unknown word is selectable;
    receiving an indication that the user interacted with the unknown word; and
    outputting for display an annotation providing additional information about the unknown word.

16. The media of claim 15, further comprising collecting user interaction data describing a user interaction with the annotation and entering the user interaction data in the user-specific VAS.

17. The media of claim 15, further comprising:
replacing the unknown word with a synonym of the unknown word that is not classified by the machine classifier as unknown.

18. The media of claim 15, wherein the method further comprises entering general language statistics into the machine classifier, the general language statistics including frequency of use for different words within a population.

19. The media of claim 15, wherein the method further comprises entering a geographic region associated with the specific user into the machine classifier.

20. The media of claim 15, wherein the subset of words in the text are potentially unknown to the user are determined based on a reading level associated with the specific user.

* * * * *